United States Patent
Sjolander et al.

(10) Patent No.: US 6,587,959 B1
(45) Date of Patent: Jul. 1, 2003

(54) SYSTEM AND METHOD FOR ADDRESSING SCHEME FOR USE ON CLUSTERS

(75) Inventors: Todd Michael Sjolander, Grafton, MA (US); Stephen James Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/362,270

(22) Filed: Jul. 28, 1999

(51) Int. Cl.[7] ............................................. H02H 3/05
(52) U.S. Cl. ........................................................ 714/4
(58) Field of Search .............................. 714/4, 6, 9, 13; 709/202, 203, 208, 211, 219, 217

(56) References Cited

U.S. PATENT DOCUMENTS

| | | | | |
|---|---|---|---|---|
| 5,253,342 A | * | 10/1993 | Blount et al. ................ 709/232 |
| 5,276,871 A | * | 1/1994 | Howarth ........................ 705/2 |
| 5,448,698 A | * | 9/1995 | Wilkes ........................ 709/245 |
| 5,537,642 A | * | 7/1996 | Glowny et al. .............. 713/200 |
| 5,561,769 A | * | 10/1996 | Kumar et al. ................ 709/202 |
| 5,802,298 A | * | 9/1998 | Imai et al. ................... 709/217 |
| 5,974,474 A | * | 10/1999 | Furner et al. .................. 710/8 |
| 6,006,331 A | * | 12/1999 | Chu et al. .................... 713/201 |
| 6,292,905 B1 | * | 9/2001 | Wallach et al. ................ 714/4 |
| 6,377,987 B1 | * | 4/2002 | Kracht ....................... 709/220 |

* cited by examiner

Primary Examiner—Dieu-Minh Le
(74) Attorney, Agent, or Firm—Bromberg & Sunstein LLP

(57) ABSTRACT

A method of forwarding a message received by a server to a coupled hardware device in a server cluster where the server cluster is comprised of a default server and a coupled backup server. A look-up table is created in the server for all hardware devices coupled to the server by a server agent. The look-up table relates a unique identifier of a hardware device to a local path. The server agent sends all of the hardware identifiers to the client. Typically, this occurs as the result of a client application requesting this information. The client can then send a message for a hardware device connected to the server. The message is attached to a unique identifier which contains the hardware identifier. The server agent then extracts the identifier from the message. The server then retrieves the look-up table and locates the path in the look-up table for the coupled hardware device based on the hardware identifier parsed from the unique identifier. The message is then forwarded through the path to the hardware device.

17 Claims, 7 Drawing Sheets

SYSTEM AND METHOD FOR ADDRESSING SCHEME FOR USE ON CLUSTERS

FIELD OF INVENTION

This invention relates to computer programs, and more particularly to addressing schemes for sending messages to peripherals connected to clustered computers.

BACKGROUND ART

In a client/server architecture, server computers may be grouped together into a cluster. A cluster could have one default server and at least one backup server. If the default server fails, all incoming messages are routed to the backup server so that it becomes the default server. In this configuration increased fault tolerance is provided. Switching between servers may be achieved through a shared common access address for all servers in the cluster, such as, a common Internet Protocol (IP) address. One software product for providing such a common address for a cluster and the capability of switching between servers has been designed by the Microsoft Corporation, of Redmond, Wash., called the Microsoft Cluster Server.

Often times each server in a cluster is connected to the same peripheral device. This peripheral may contain data storage for client applications. All clustered servers are capable of accessing this data and providing it to client applications, but only one server (the aforementioned default server) will access the data at any one time. The clustered servers all use the same "name" or "handle" to refer to a peripheral device, such as, a data storage area (this name is typically provided by the user when creating the data storage). Clustering technology allows the client application to be unaware of which server is handling the request for accessing the data storage area, because all servers are capable of responding to the common IP address of the cluster, and all servers use the same "name" or "handle" to refer to the data storage area. Therefore, when the default server fails, the backup server transparently provides access to the data storage area, because the "name" or "handle" will be the same.

However, when the client application is actually managing the peripheral device (as opposed to accessing the data on it), the "name" or "local path" of the device may not be the same between servers in the cluster. For example, if the peripheral is a storage processor, the device name on one server may be a concatenation of the host bus adapter slot number, the disk array storage processor slot id, and a logical unit number (lun) on the disk array. If another server in the cluster uses a different host bus adapter slot number, the concatenated device name or local path will be different. This will result in a loss of the ability to transparently manage the peripheral in a cluster, which is unacceptable and contrary to the services provided by clustering software. In the text that follows, the term local path and concatenated device name shall be synonymous.

Client applications that manage peripherals commonly communicate with the peripheral via "agent" software running on the server connected to the peripheral. This agent uses commonly known network transport mechanism (i.e. sockets over TCP/IP) to send and receive data to and from client applications. Should the client application wish to send a message to a peripheral device of a server, the client application will pass the message, along with the concatenated device name, to the agent. The agent will then simply pass the message to the peripheral using an established method provided by the server's operating system (i.e. a SCSI pass-through IOCTL interface). FIG. 1 shows a block diagram of a client sending a message to a server cluster. The designation "ABC" represents the complete local path. In this example the final destination is a storage processor that is attached to the server. Here the letter "A" represents the host bus adapter, the letter "B" represents the SCSI address of the storage processor, and the letter "C" represents the LUN unit on the storage processor that is to be communicated with.

Providing the full local path is an adequate addressing solution, as long as, the default server does not fail. When the default server fails and the message is rerouted to the backup server, the local path may no longer be valid. FIG. 2 shows a block diagram of this situation. Server "X" fails and the message is routed to server "Y". The message/request is attempting to reach a logical group of disks "C", however the local path is not "ABC" but is now "DEC". Thus, in this prior art addressing scheme, the message fails to reach the destination.

SUMMARY OF THE INVENTION

In accordance with one aspect of the invention, a method of forwarding a message received by a server to a coupled hardware device is provided. The method may also be accomplished in a server cluster where the server cluster is comprised of a default server and a coupled backup server.

A look-up table is created in the server for fall hardware devices coupled to the server by a server agent. The look-up table relates a unique identifier of a hardware device to a local path (i.e. "ABC"). The lookup table is stored in memory accessible by the server agent.

The server agent sends all of the hardware identifiers to the client. Typically, this occurs as the result of a client application requesting this information. The client can then send a message for a hardware device connected to the server. The message is attached to a unique identifier which contains the hardware identifier. The server agent then extracts the identifier from the message, because the server and the client are using an agreed-upon structure to send messages back and forth to each other. The server then retrieves the look-up table and locates the path in the look-up table for the coupled hardware device based on the hardware identifier parsed from the unique identifier. The message is then forwarded through the path to the hardware device.

If the method is implemented in a server cluster environment, each server may initially identify if any hardware devices are attached to the server and access a hardware identifier for each hardware device that is found attached to the server. The hardware identifier can be accessed using standard protocols such as SCSI mode sense, or the protocols suggested by the attached peripheral. From the hardware identifiers, each server creates a look-up table. The lookup table is an association between the hardware identifier and a path where the path comprises a local access channel from the input of the server to the hardware device. Port numbers of the hardware device may be included within the unique identifier.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing features of the invention will be more readily understood by reference to the following detailed description taken with the accompanying drawings.

DETAILED DESCRIPTION OF SPECIFIC EMBODIMENTS

The term "client" may refer to a computer program that resides on a computer or the combination of a computer and the computer program that resides on the computer. Information necessary to implement the teachings herein are known to those of ordinary skill in this art and are available from sources such as Tannenbaum, *Computer Networks*, Prentice Hall(3rd Edition,1996), Burk, Bligh, Lee et al., *TCP/IP Blueprints* Sams Publishing (1st Edition 1997), ANSI SCSI standard X3.131-1986, and *Cluster Strategy: High Availability and Scalability with Industry-Standard Hardware*, White Paper, Microsoft Corporation (1998) which are incorporated by reference in their entirety herein.

Figure 1:
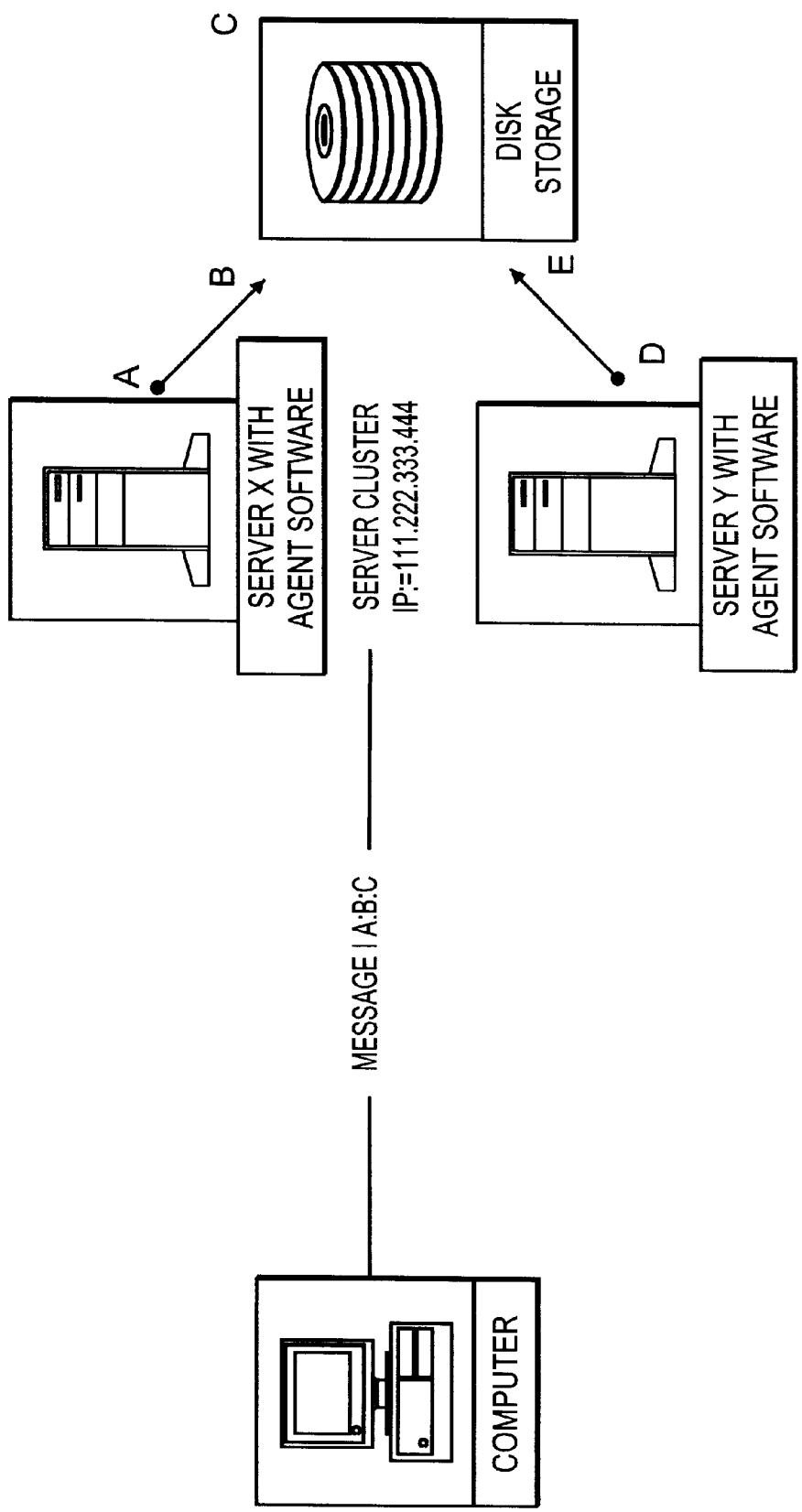
FIG. 1 is a block diagram of a client and server cluster showing the operation of a prior art addressing scheme for sending messages to the server cluster.
Figure 2:
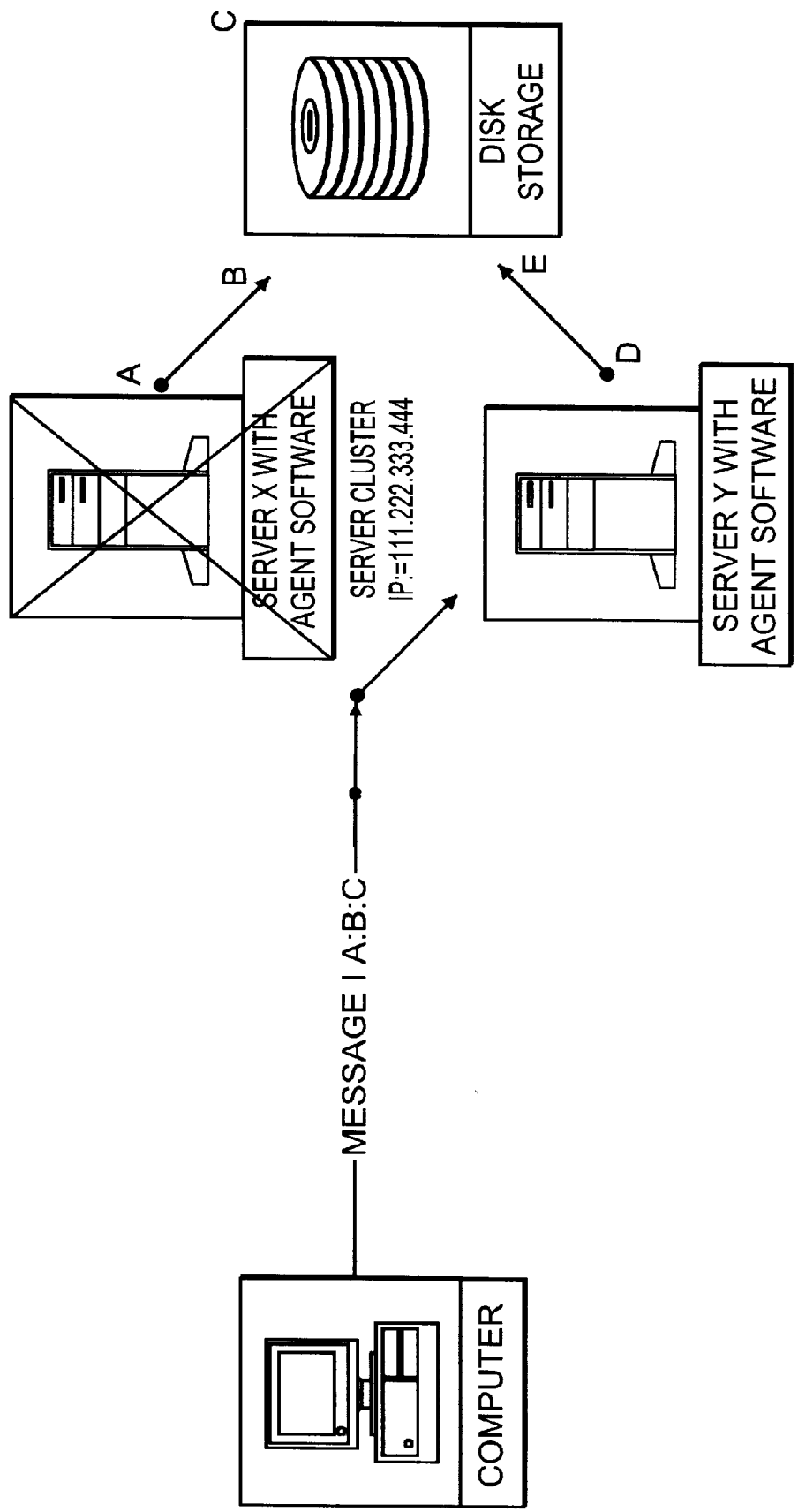
FIG. 2 is a block diagram of a client and a server cluster showing a scenario where the prior art addressing scheme fails.
Figure 3:
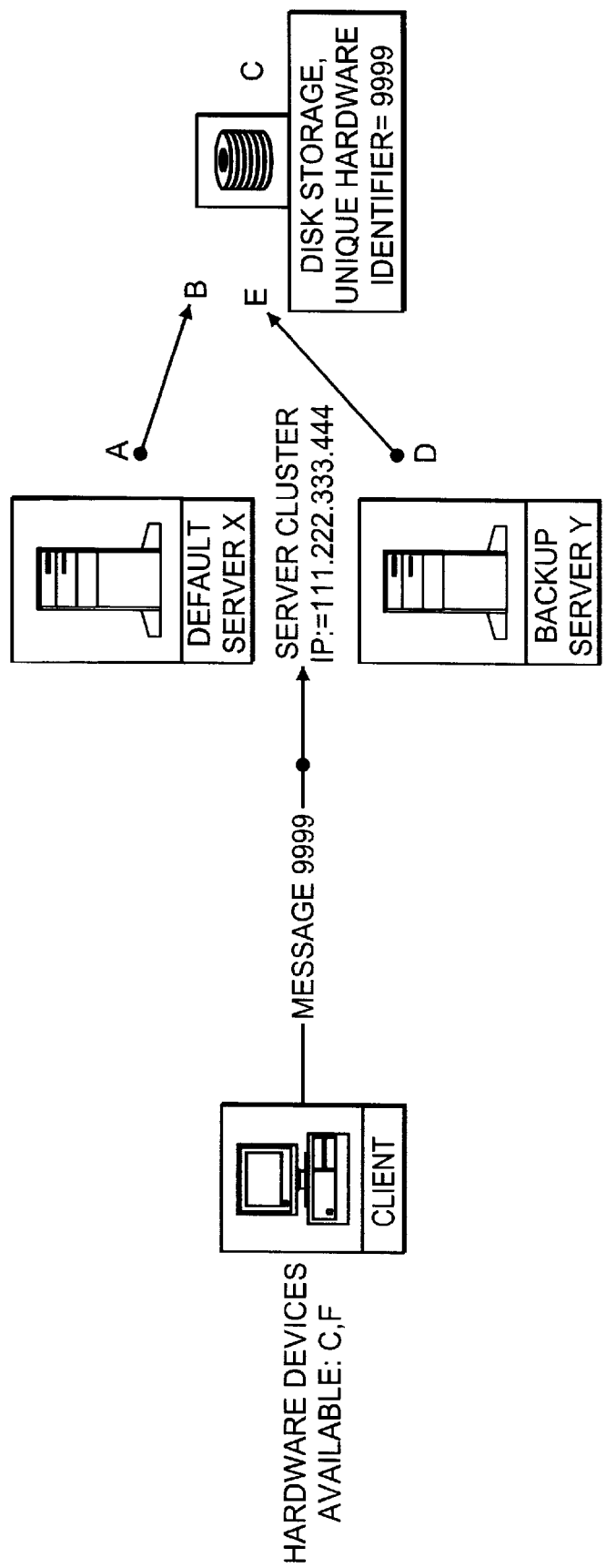
FIG. 3 is a block diagram of a client and a server cluster where the client is sending a message to the server cluster.

FIG. 3 is a block diagram of a client and a server cluster. The server cluster is composed of at least two servers, managed as a single system where all servers share peripheral devices. Messages to the server cluster are addressed through a default server, such that the default server is accessed so long as the default server does not fail. In the event of a server failure, applications are migrated to the backup server. More servers may be added to the server cluster in order to provide a greater fault tolerance in case of multiple server failures. In FIG. 3, the client is shown sending a message to the server cluster. The message is specifically addressed to a hardware device which is shared by the servers within the server cluster and the shared hardware device is coupled to each of the servers within the cluster. The hardware device may be a disk drive, a logical group of disk arrays, a printer, a CD-ROM, a scanner or any other peripheral computer device. The message is received by the server cluster based upon the common address of the server cluster. A management software program such as Microsoft's Cluster Server software is enabled on the server cluster which creates a virtual IP address which is shared by all of the servers within the cluster. Provided that the agent software on the default server does not fail, the default server forwards the message and the backup server is not utilized. The backup server becomes the default server when there is a malfunction or failure in the default server. When a malfunction occurs, the management software program routes all messages through the backup server.

An addressing scheme must therefore provide a way to couple with the routing change between servers and account for the variety of local paths to the hardware devices.

Figure 4:
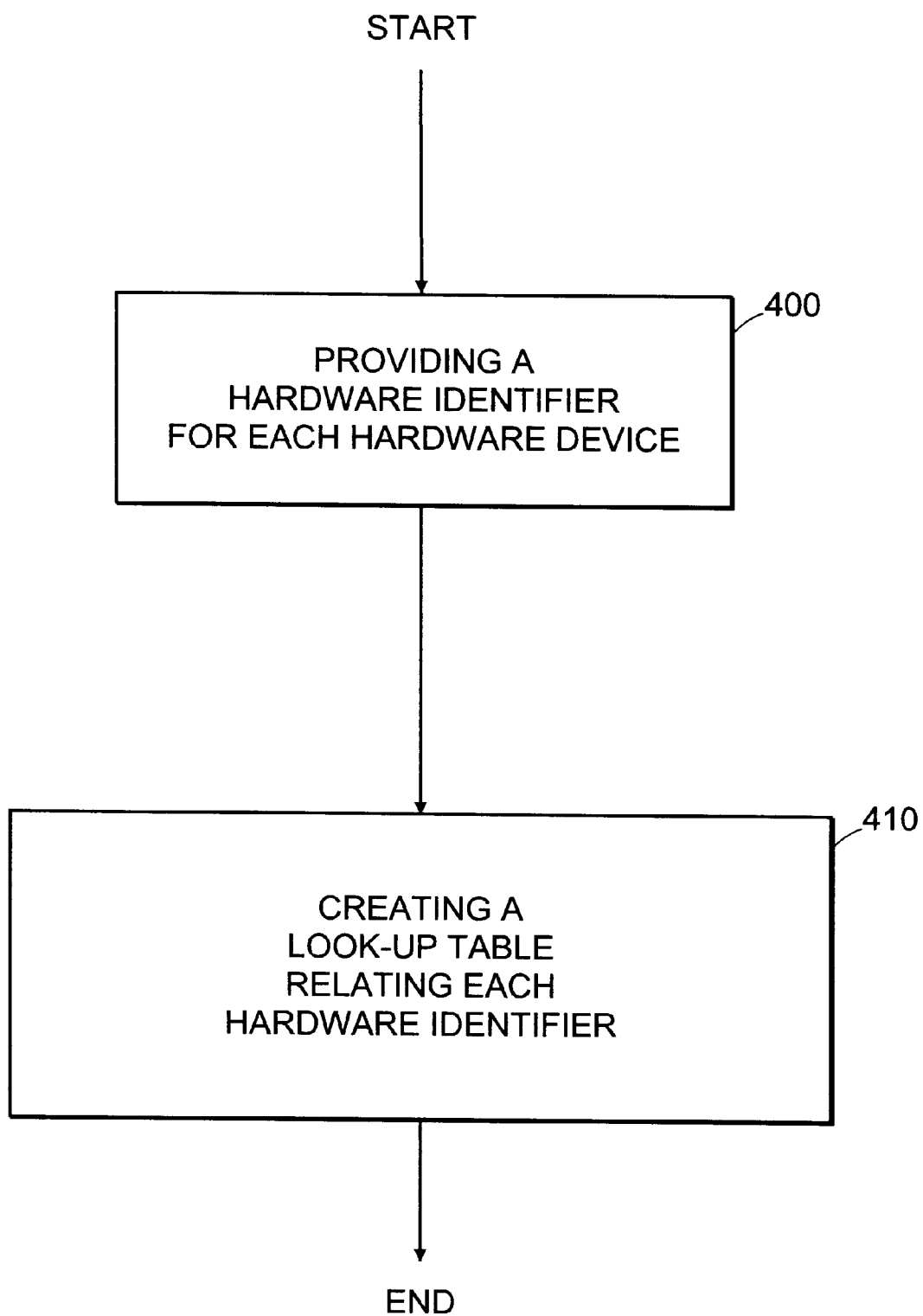
FIG. 4 is a flow chart showing the steps taken in a server when the server agent software is first executed.

FIG. 4 shows a flow chart of the steps in a server when routing software is initially executed. Prior to a message being sent from the client to the server cluster, when each server is initialized, each server automatically polls all ports to determine what hardware devices are connected. During the polling process the server retrieves a hardware identifier or "name" for the hardware device (400). The hardware identifier may be assigned by the manufacturer or assigned by a regulatory body. One example of a hardware identifier is a World Wide Name. The polling process is accomplished in a preferred embodiment by requesting local path information from the operating system. The operating system in response to the request returns the local path to the agent software on the server. The agent software then opens the local path and sends a query command to the device, such as, a SCSI inquiry command. The returned signal from the peripheral device indicates the type of device connected, such as a tape, a CD-ROM., or a disk array. In the preferred embodiment, if a disk array is encountered the agent software makes a more specific inquiry. The agent software executes a vendor unique command, such as a mode-sense command which if the device is from the expected vendor will return an affirmative response.

The server agent then associates the hardware identifier with a local path which is a path from the server to the hardware device (410). In such a fashion, each server creates a mapping between the hardware identifier and the local path for the hardware and stores this information in a look-up table. For example, in FIG. 3 for server "X", the logical group of disks represented by hardware identifier "9999" is equated by the agent software to path "ABC" in a look-up table. For server "Y" the logical group of disks represented by "9999" is equated by the program to path "DEC" in a look-up table. In the event that there are multiple local paths associated with a peripheral device the agent software may include all paths in the look-up table and access only the first path unless the first path fails. In an alternative embodiment, the agent software may only use one of the local paths for a peripheral device and may purge all other local paths for the peripheral device on the server. After the lookup table is completed all of the hardware identifiers may be transmitted to the client either asynchronously or upon request from the client. By sending only the hardware identifier to the client, creating a mapping of the hardware identifier to the local path in the lookup table, and providing continually running agent software which looks up the local path in the lookup table for each hardware identifier sent with a message, messages may be sent to the server cluster without designating the local path to be taken in the server cluster to reach the hardware device.

Figure 5:
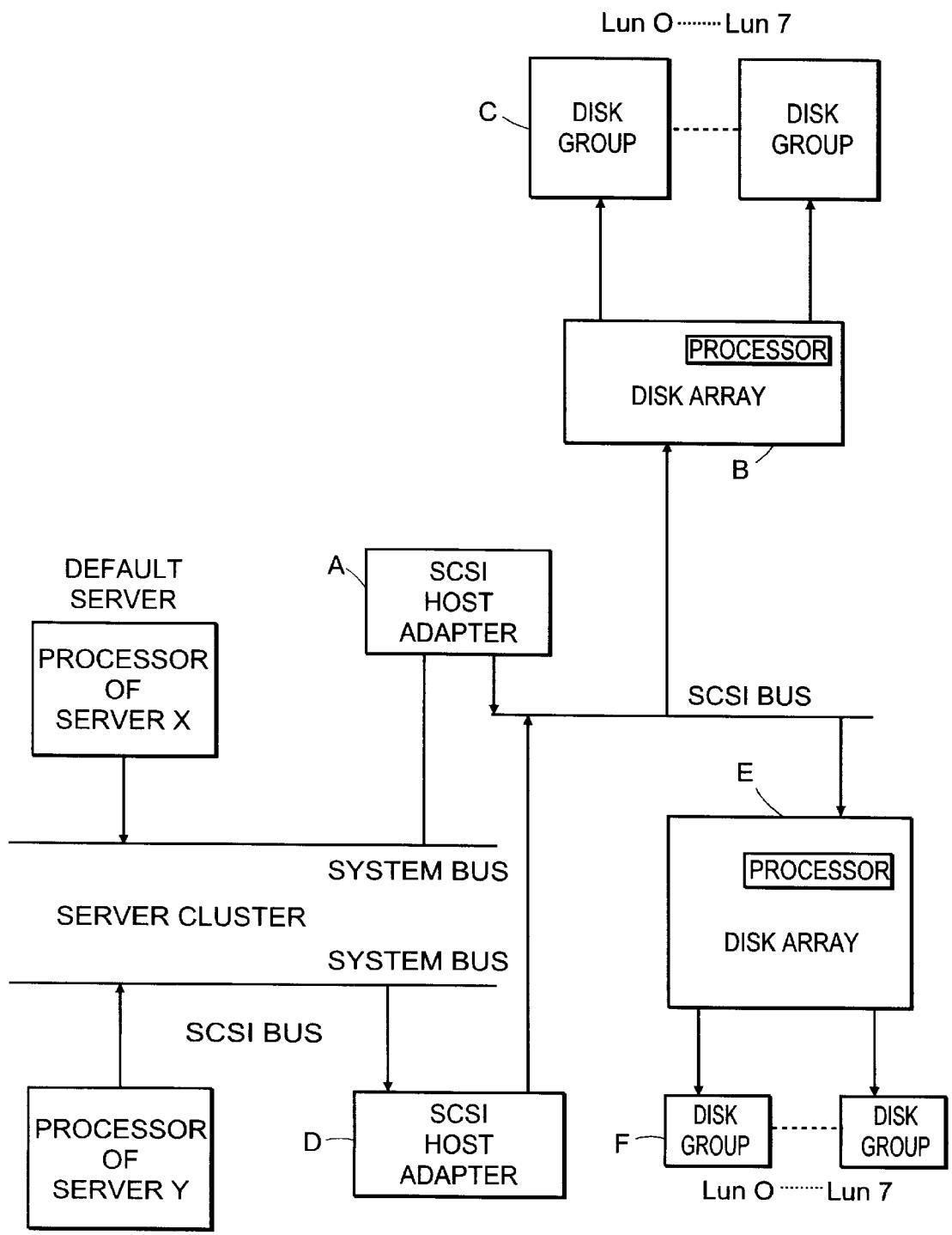
FIG. 5 is a detailed view of one embodiment of the system showing the local paths in a server cluster.

The look-up table may include an association between the hardware address and the local path to reach the hardware device as well as port and bus information. The path from the server to the peripheral device may cross multiple busses to which other devices are connected such as in a SCSI chain or have multiple connection points including multiple ports. In order to resolve the local path, the look-up table may include specific bus identifiers, port numbers or other hardware device internal identifiers. For instance FIG. 5 shows two processors, server "X" and server "Y" connected to the same SCSI bus. If a message is sent to the server cluster from the client to access data on Disk C, the default server must select the correct local path to manage disk C. For server X, the local path address to disk C is A, the SCSI host bus adapter address, then to B which is the SCSI address of the disk array, and to LUN 0 and then to disk C of the LUN group. If the default server fails and server Y is transferred control, the proper local path is now through SCSI host adapter D, through the SCSI bus, and then to disk array B where the processor may retrieve the requested information from Disk C of LUN Group 0. The lookup table should include the address of the SCSI host adapter, the address of the disk array on the SCSI bus, as well as, the port for the particular LUN in addition to the disk. The look-up table must include enough detail to provide local path information from the server to the desired destination as represented by the hardware identifier.

Once the look-up table is formed and the hardware identifiers are sent to the clients, the client software may then allow a message to be formulated. The message may be created automatically by the client program in response to the occurrence of an event or the message may be formulated by a user through a Graphical User Interface(GUI) in the client software. The message may activate a device, make a request to a device for the transmission of data from a memory location, request updated system information, or any other message that may be pertinent to communicating with peripheral hardware devices. In the preferred embodiment, the shared hardware device is a disk array. One example of a message for a disk array is a request for the retrieval of information from a particular location in the memory of the disk array.

After a message is formulated, the client program appends to the message a unique identifier which includes the hardware identifier. The unique identifier provides at a minimum a distinct name for the device that the message is being forwarded to. The unique identifier may also contain the connection structure such as the LUN number of a disk array. Rather than include the LUN number in the look-up table the LUN number may be part of the unique identifier.

Figure 6:
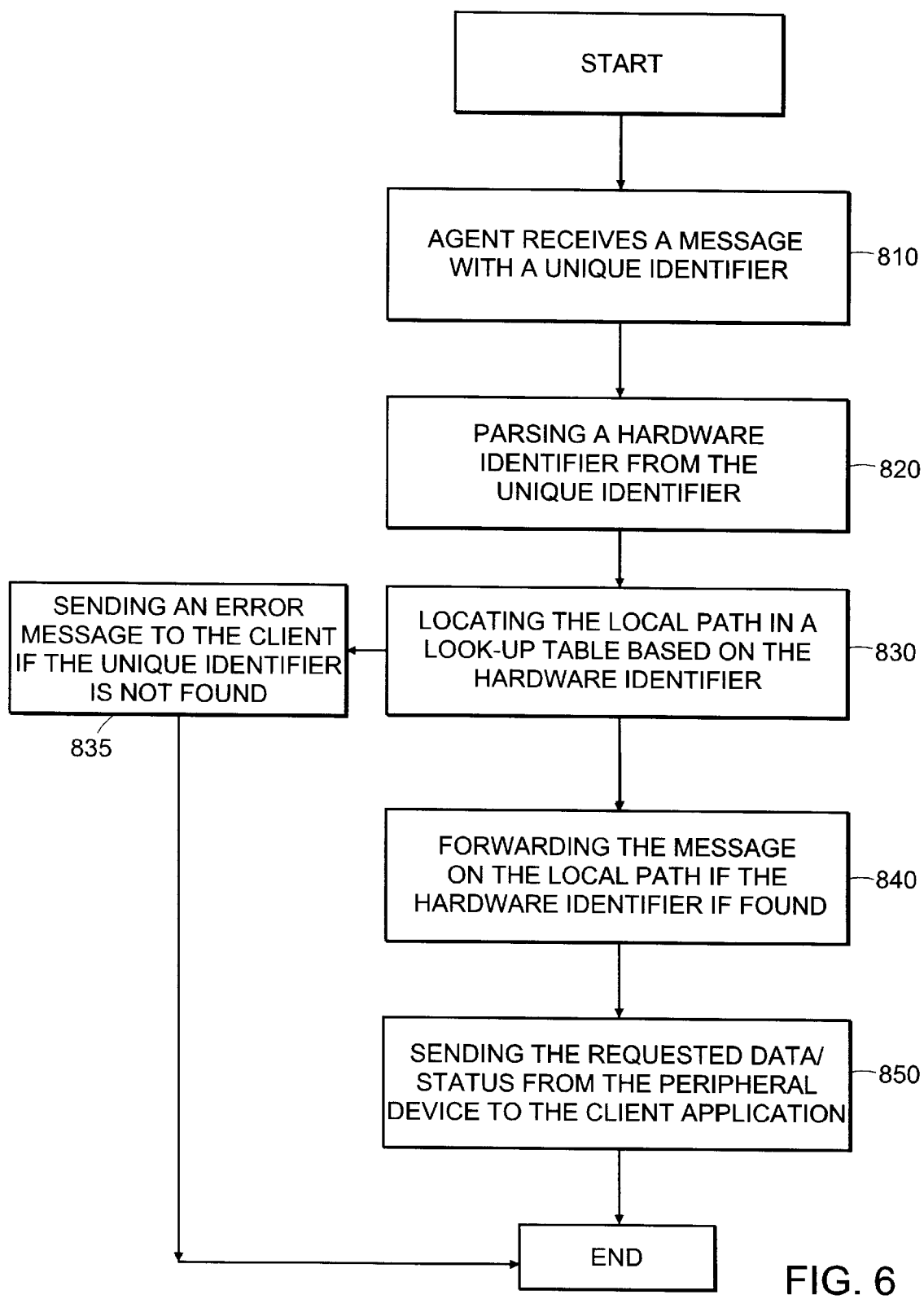
FIG. 6 is a flow chart explaining the steps taken by a server upon receiving a message with an appended unique identifier.

In the preferred embodiment, the client's message is sent to the server cluster's IP address and the cluster management software directs the information to the default server agent for forwarding to the hardware device as shown in the steps of FIG. 6. The agent software which is actively running receives the unique identifier and the message (810). The agent software then parses a hardware identifier from the unique identifier (820). The agent software retrieves the look-up table from memory. Once the look-up table is retrieved, the program locates the hardware identifier that was sent with the message and retrieves.the corresponding local path of the hardware (830). If there is no matching hardware identifier found, the agent returns an error to the client application stating that it could not find a match. Otherwise, the software forwards the message to the local path (840). Any error status and/or data returned from the peripheral will be sent back over to the client application. The agent software returns the requested status/data from the peripheral device to the client application (850). In alternative embodiments, the unique identifier may contain port information in addition to the hardware identifier, and as a result, the look-up table would not require the port information for a complete local path.

By providing a routing program on the server which creates a look-up table, and which can retrieve the local path for a given hardware identifier from the look-up table, only the hardware identifiers need be sent to the client upon initialization, rather than, every path for each hardware device. Therefore, bandwidth is conserved between the client and server cluster.

Figure 7:
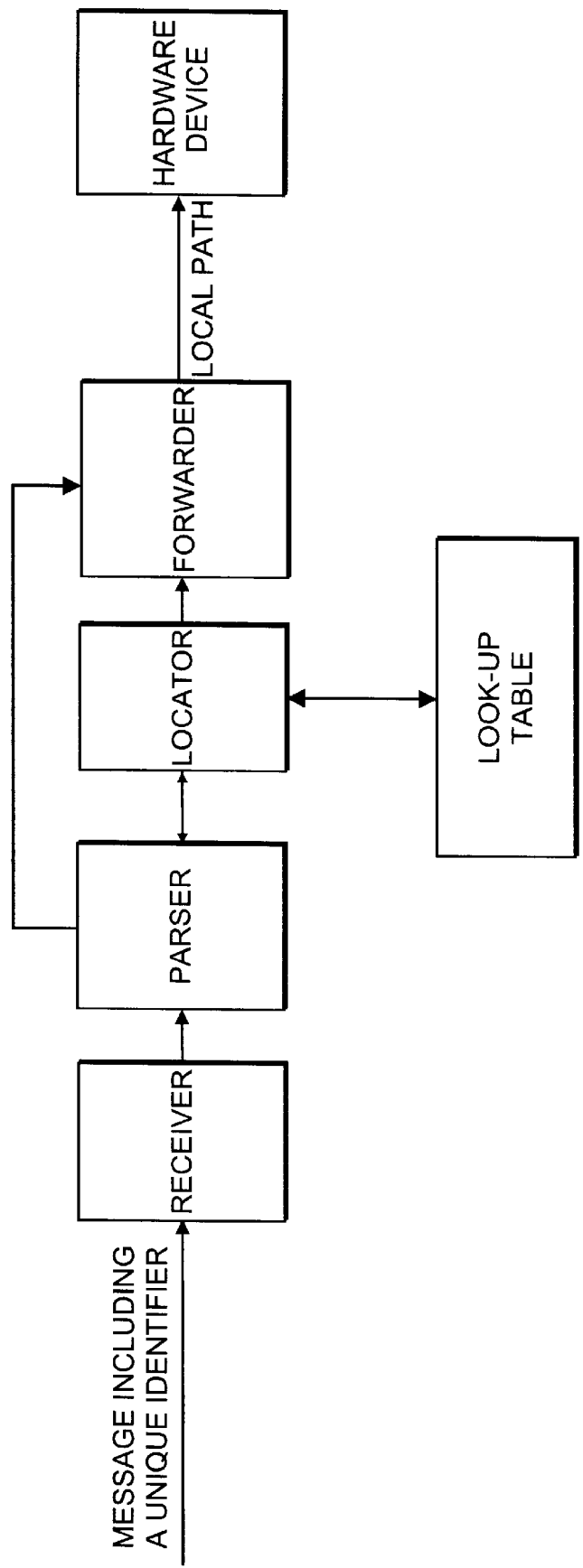
FIG. 7 is a block diagram showing the modules of the routing software.

As shown in FIG. 7 the routing software may be compose of various modules. The software may include a receiver module for receiving an input signal from the management software and identifying the type of message based on the format. From the receiver the input signal is passed to a parser module which knows the protocol format of the unique identifier. The parser separates the unique identifier from the message and parses the unique identifier to locate the hardware identifier. The hardware identifier is passed to the locator module which accesses the look-up table and attempts to locate the hardware identifier and the associated local path if the locator module can't locate the hardware identifier, an error is returned to the client application.

When the local path is found the message is retrieved from the parser and passed to the forwarder along with the local path. The forwarder sends the message to the hardware device which is located at the end of the local path.

Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements (e.g., application specific integrated circuits), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A method for forwarding a message to a hardware device received by a server cluster, the server cluster having a default server and at least one backup server, the server cluster also having a common address, the peripheral hardware device being shared by the server cluster and having a unique peripheral hardware identifier that is not assigned by a server's operating system, the method comprising:

creating a look-up table in each server which relates each unique peripheral hardware identifier to a local path wherein the same unique hardware identifier is used in each server;

receiving at the server cluster a message including a unique peripheral hardware identifier;

parsing a unique peripheral hardware identifier from the message;

locating the local path in the look-up table for a peripheral hardware device based on the unique peripheral hardware identifier; and forwarding the message along the local path to the peripheral hardware device.

2. A method according to claim 1, wherein the message includes a port number for the peripheral hardware device.

3. A method according to claim 1, further comprising determining if the default server has malfunctioned; and switching to the backup server if the default server has malfunctioned.

4. A method according to claim 1, wherein the peripheral hardware device is a logical group of disks in a disk array.

5. A method according to claim 4, wherein the local path comprises a host bus adapter identifier, a SCSI address of a storage processor, and a logical unit number of the group of disks.

6. A method of sending a message between a client and a peripheral hardware device of a server cluster, the server cluster having a default server and at least one backup server, the server cluster also having a common address, the peripheral hardware device being shared by the server cluster and having a unique peripheral hardware identifier that is not assigned by a server's operating system, the method comprising:

sending a message including the unique peripheral hardware identifier from the client to the common address of the server cluster;

parsing the unique peripheral hardware identifier from the message in the server cluster;

looking up a path for the unique peripheral hardware identifier in a look-up table in the default server; and forwarding the message to the peripheral hardware device in accordance with the local path.

7. The method according to claim 6, further comprising:

sending the unique peripheral hardware identifier from the server cluster to the client.

8. A method according to claim 6, wherein the peripheral hardware device is a logical group of disks in a disk array commonly shared by the server cluster.

9. The method according to claim 6, wherein the common address is an Internet Protocol address.

10. A method according to claim 6, further comprising:

determining in the server cluster if the default server has malfunctioned; and switching to the backup server if the default server has malfunctioned.

11. A computer program product on a computer readable medium for forwarding a message received by a server cluster to a commonly shared piece of peripheral hardware of the server cluster comprising:

computer code for creating a look-up table in each server of the server cluster for all peripheral hardware devices coupled to the server cluster which relates a unique peripheral hardware identifier of a peripheral hardware device to a local path wherein the unique peripheral hardware identifier is not assigned by an operating system wherein the unique peripheral hardware identifier for a peripheral hardware device is shared by all servers in the server cluster;

computer code for receiving at a server of the server cluster a message with a unique peripheral hardware identifier appended;

computer code for parsing from the message, the unique peripheral hardware identifier;

computer code for locating the local path in the look-up table for the peripheral hardware device based on the unique peripheral hardware identifier; and computer code for forwarding the message to the local path.

12. A computer program product according to claim 11, wherein a common address is appended to the message and the unique peripheral hardware identifier, further comprising:

computer code for parsing the common address; and computer code for validating that the common address is for the server cluster.

13. A method of sending a message between a client and shared peripheral hardware of a server cluster having one default and at least one backup server, the server cluster having a common address, the peripheral hardware having a unique peripheral hardware identifier, the method comprising:

selecting at the client a shared peripheral hardware device of the server cluster to send a message;

creating at the client an address identifier comprising at least the unique peripheral hardware identifier for the selected peripheral hardware device appended to the common address;

sending a message to the shared peripheral hardware device of the server cluster appended to the address identifier;

receiving the message and the address identifier at the server cluster;

parsing the unique peripheral hardware identifier from the address identifier;

mapping the unique peripheral hardware identifier of the selected peripheral hardware to a local path wherein the unique peripheral hardware identifier for the peripheral hardware is shared by all servers in the server cluster; and forwarding the message to the shared peripheral hardware device based on the local path.

14. The method according to claim 13, further comprising:

transferring the unique peripheral hardware identifier for each shared peripheral hardware device to the client.

15. The method according to claim 13, wherein the shared peripheral hardware device is a logical group of disks in a disk array.

16. The method according to claim 13, wherein the common address is an Internet protocol address.

17. A digital storage medium encoded with instructions which, when loaded into a computer forwards a message to a peripheral hardware device received by a server cluster, the server cluster having a default server and at least one backup server, the server cluster also having a common address, the peripheral hardware device being shared by the server cluster, the device comprising:

a receiver module at the server for receiving a message with a unique peripheral hardware identifier appended;

a parser for parsing the unique peripheral hardware identifier from the message;

a locator for locating a local path in a look-up table which relates each unique peripheral hardware identifier to a local path for the coupled peripheral hardware device based on the unique peripheral hardware identifier wherein the unique peripheral hardware identifier is not provided by an operating system; and a forwarder for forwarding the message to the peripheral hardware device along the local path.

* * * * *